US008069214B1

(12) United States Patent
Dowd et al.

(10) Patent No.: US 8,069,214 B1
(45) Date of Patent: *Nov. 29, 2011

(54) METHOD AND APPARATUS FOR MANAGING MESSAGING IDENTITIES

(75) Inventors: Stephen Dowd, Cambridge, MA (US); Chris C. Rowen, Bedford, NH (US); Peter A. Spooner, Hollis, NH (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,971

(22) Filed: Feb. 18, 2011

Related U.S. Application Data

(63) Continuation of application No. 11/159,280, filed on Jun. 22, 2005, now Pat. No. 7,908,326.

(51) Int. Cl.
*G06F 15/16* (2006.01)
(52) U.S. Cl. ........................................ 709/206; 709/205
(58) Field of Classification Search ........... 709/204–206
See application file for complete search history.

(56) References Cited

U.S. PATENT DOCUMENTS

| | | |
|---|---|---|
| 6,185,603 B1 | 2/2001 | Henderson et al. |
| 6,249,807 B1 | 6/2001 | Shaw et al. |
| 6,442,591 B1 | 8/2002 | Haynes et al. |
| 6,510,455 B1 | 1/2003 | Chen et al. |
| 6,523,021 B1 | 2/2003 | Monberg et al. |
| 6,591,273 B2 | 7/2003 | Jenkins et al. |
| 6,609,138 B1 | 8/2003 | Merriam |
| 6,854,007 B1 | 2/2005 | Hammond |
| 6,915,333 B2 | 7/2005 | Delia et al. |
| 7,054,906 B2 | 5/2006 | Levosky |
| 7,065,555 B2 | 6/2006 | Foulger et al. |
| 7,552,179 B2 * | 6/2009 | Jain et al. ...................... 709/206 |
| 7,568,008 B2 | 7/2009 | Jain et al. |
| 7,603,420 B2 | 10/2009 | Doan et al. |
| 2005/0204011 A1 * | 9/2005 | Velayudham ................. 709/206 |
| 2005/0223062 A1 * | 10/2005 | Doan et al. .................... 709/206 |
| 2006/0031357 A1 * | 2/2006 | Misra et al. .................... 709/206 |
| 2006/0277260 A1 | 12/2006 | Hardy, Jr. |

OTHER PUBLICATIONS

U.S. Appl. No. 11/159,281, filed Jun. 22, 2005, pp. 1-30.
U.S. Appl. No. 11/159,279, filed Jun. 22, 2005, pp. 1-30.

* cited by examiner

*Primary Examiner* — David Lazaro
*Assistant Examiner* — Marie Georges Henry
(74) *Attorney, Agent, or Firm* — Dergosists & Noah LLP; Todd A. Noah

(57) ABSTRACT

A method and apparatus for use in a computer system comprising an email system that generates and receives email messages. The email system manages a first plurality of email messages comprising at least some of the email messages generated and received by the email system. The email system also has a global address catalog that comprises information and provides an index into the first plurality of email messages. The computer system further comprises an extension system that interfaces with the email system and manages a second plurality of email messages comprising at least some of the email messages generated and received by the email system. The method comprises creating an extender catalog, for indexing into the second plurality of email messages, that comprises at least some information that is different than the information in the global address catalog.

20 Claims, 6 Drawing Sheets

METHOD AND APPARATUS FOR MANAGING MESSAGING IDENTITIES

RELATED APPLICATION

This application is a Continuation of U.S. patent application Ser. No. 11/159,280, filed on Jun. 22, 2005 entitled, METHOD AND APPARATUS FOR MANAGING MESSAGING IDENTITIES. The entire contents of U.S. patent application Ser. No. 11/159,280 is incorporated herein by reference.

FIELD OF INVENTION

The present invention relates to message management systems.

BACKGROUND

Conventional message management systems provide capabilities for the collection, organization, monitoring, storage, and retrieval of incoming and outgoing email messages. Some message management systems also enable administrators to set criteria for storing email messages, and/or attachments associated therewith, by copying and/or moving them to secondary storage locations, and may include centralized storage and retrieval capabilities that can automatically move email messages and/or attachments between main and secondary storage. Some email message management systems can also capture and index incoming and outgoing emails, and allow users and administrators to search emails.

FIG. 1 illustrates a block diagram of a conventional system 100 in which a message management system 105 enables email archive searching. The message management system 105 includes an email archiver 134 and an email archive searcher 120. The email archiver 134 retrieves incoming and outgoing emails from an email server 132 and archives the email messages in an email archive 130. Email archive 130 refers to a store of emails, which may be stored on any type of storage, and need not be limited to a long-term form of storage (e.g., tape). For example, the email archive may be stored on magnetic tapes, compact discs, hard disks and/or any other form of storage.

System 100 also comprises a global address catalog (GAC) 110 containing a list of messaging identities in an organization. The GAC 110 may be used by the message management system 105 to present a list of display names for the messaging identities in the organization, and a user may select one or more of the display names whose associated emails (in the email archive 130) the user wishes to search for. The email archive searcher 120 may resolve the display names into one or more associated email addresses using information contained in the GAC 110, and execute a search of the email archive 130 for emails received at and/or sent from the associated email addresses. The email archive searcher 120 may output search results 140 of the email messages (in the email archive 130) that have been received at and/or sent from the email addresses associated with the selected display names.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Figure 1:
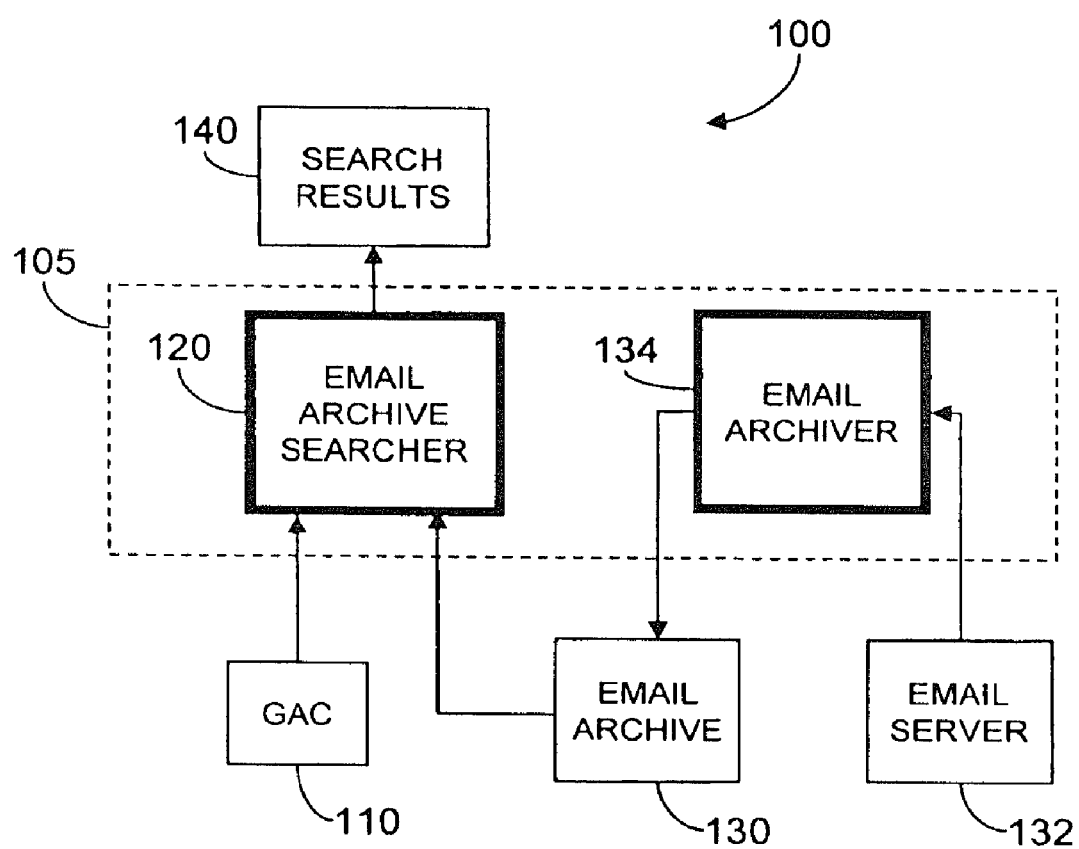
FIG. 1 is a block diagram of a prior art system on which an email archive searcher is implemented.

Email management systems can operate in conjunction with an email system and manage the archiving of an organization's incoming and outgoing email messages. As used herein, an email management system may be referred to as an extension system for an email system, since the email management system can extend the capabilities of the email system.

Email management systems can allow a user to search an email archive for messages sent and/or received by a specified messaging identity in the organization. A list of messaging identities in an organization (e.g., people, distribution lists, aliases, etc) with associated display names, email addresses, and other identity information may be contained in a global address catalog (GAC) provided by the email system. As such, a GAC can serve as an index into a plurality of stored email messages by providing an association between messaging identities and information (e.g., display name, email address) that may be used to determine which emails belong to a given messaging identity.

An example of an email management system is the EmailXtender® email management system product offered by EMC Legato, a division of EMC Corporation of Hopkinton, Mass., but the aspects of the invention described herein are not limited to use with this or any other particular type of email management system, and can be used with any email management system.

Examples of GACs are the global address list (GAL) used by the Microsoft Outlook® and Microsoft Exchange Server® email system offered by Microsoft Corporation of Redmond, Wash., and the global address book (GAB) used by the Lotus Notes® and Lotus Domino® email system offered by International Business Machine Corporation of Armonk, N.Y. In the description that follows, GAC is used to refer to any global list of messaging identities and is not be limited to the list of identities used by any particular email system.

As noted previously, an email message management system may allow a user to select a messaging identity in a GAC and search an email archive for emails received or sent by the selected identity. For example, if the user wishes to retrieve emails associated with a specific person, the email message management system may search the email archive for email messages received at or sent from the email address of the specific person.

During such a process, the email message management system may retrieve information about messaging identities stored in the GAC. Retrieving information from the GAC may be accomplished via an application program interface (API) provided by the email system. Therefore, although an email message management system may construct and maintain its own email archive, the email message management system may refer to the GAC for numerous purposes. For instance, the email message management system may use the GAC to construct a list of messaging identities in the organization, and to resolve a messaging identity into associated email addresses. Once a list of email addresses associated with a selected messaging identity is deduced, the message management system may search the email archive for emails received at or sent from at least one of the email addresses associated with the selected messaging identity.

Messaging identities in the GAC may be associated with any number of valid email addresses. Furthermore, the GAC may also contain legacy email addresses, corresponding to former email addresses that may have been associated with a person (or group) at a prior point in time. In such an instance, the former email addresses may be retained and stored in the GAC as legacy email addresses, with some information being included to correlate the legacy email addresses to the current non-legacy addresses. For example, a person (e.g., "John Smith") who works for a company that is restructured (e.g., via an acquisition or merger) may have a current email address "JSmith@Company.com" associated with the newly organized company and a legacy email address "JSmith@Acquired.com" associated with the person prior to the organization restructuring.

In conventional systems, the GAC is a dynamic listing of messaging entities which evolves over time. For example, if an employee leaves an organization, an administrator may choose to reuse the employee's email addresses by eliminating their associated entry from the GAC. For example, if John Smith, referenced above, were to leave the company and a Jane Smith were to become employed thereafter, the administrator may chose to reuse the "JSmith@Company.com" email address. Furthermore, an administrator may edit a display name and/or email address in the GAC to reflect a name change of an employee (e.g. resulting from a marriage). In other cases, an administrator may create a new entry in the GAC for a new user, with associated email addresses, and any other associated information.

Applicants have appreciated that changes to the GAC may result in difficulties searching an email archive using information contained in the GAC. For example, when an administrator edits and/or removes an identity's data, or the entire identity's entry, from the GAC, an email message management system may not be able to determine email addresses associated with that identity. For example, when an identity's entry is deleted from the GAC, the GAC will no longer contain the identity's email addresses, and therefore, the email message management system will be unable to determine the identity's email addresses so as to search the email archive. Also, when an identity's email addresses in the GAC are modified over time, previous addresses may not necessarily be stored in the GAC, and therefore, the email message management system may be unable to determine all the identity's associated email addresses. In such an instance, a search of the email archive based on the identity's retrieved email addresses may not return all the identity's associated emails, since some emails may be associated with former email addresses not contained in the GAC.

In one embodiment, a global messaging identities catalog is created and maintained distinct from the GAC 110, and is referred to as a super GAC or an extender catalog (which may be associated with an extension system for an email system), wherein the super GAC may have different information from that contained in the GAC 110. The nature of the differences between the information in the GAC and the super GAC can take any form, as the aspect of the invention related to the use of a super GAC is not limited in this respect. In one embodiment, the super GAC can preserve at least some information deleted from the GAC. In another embodiment, information from other sources (examples of which can include human resource records, payroll records, the email archive, etc. as discussed below) can be added to the super GAC.

In another embodiment, the validity of an email address for a particular user is bound with an effective temporal period. For example, in the case of John Smith, referenced above, the email address "JSmith@Company.com" may be associated with John Smith for an effective temporal period, and beyond that period, that email address may be associated with another person in the organization. The effective temporal period may be specified by a begin time alone, an end time alone, both a begin and end time, or any other technique, as the invention is not limited in this respect. As used herein, the term time refers to any temporal indicator of any granularity (e.g., year, month, day, hour, minute, etc.).

In a further embodiment, a capability is provided to enable a GAC (or super GAC) to be searched based not only on a specified display name, but on other attributes. Examples of such other attributes include email address, domain account name, and other messaging identity attributes, but this aspect of the invention is not limited to these examples. As used herein, a domain account name refers to a name that in combination with a password enables access to an associated account on a networked domain of resources (e.g., computers, file shares, printers, etc.).

The capability of searching a GAC (or super GAC) based not only on a display name, but on other attributes, provides flexibility in searching a GAC (or super GAC) for particular identities, since the GAC (or super GAC) may be searched for identities that possess any known attribute.

Figure 2:
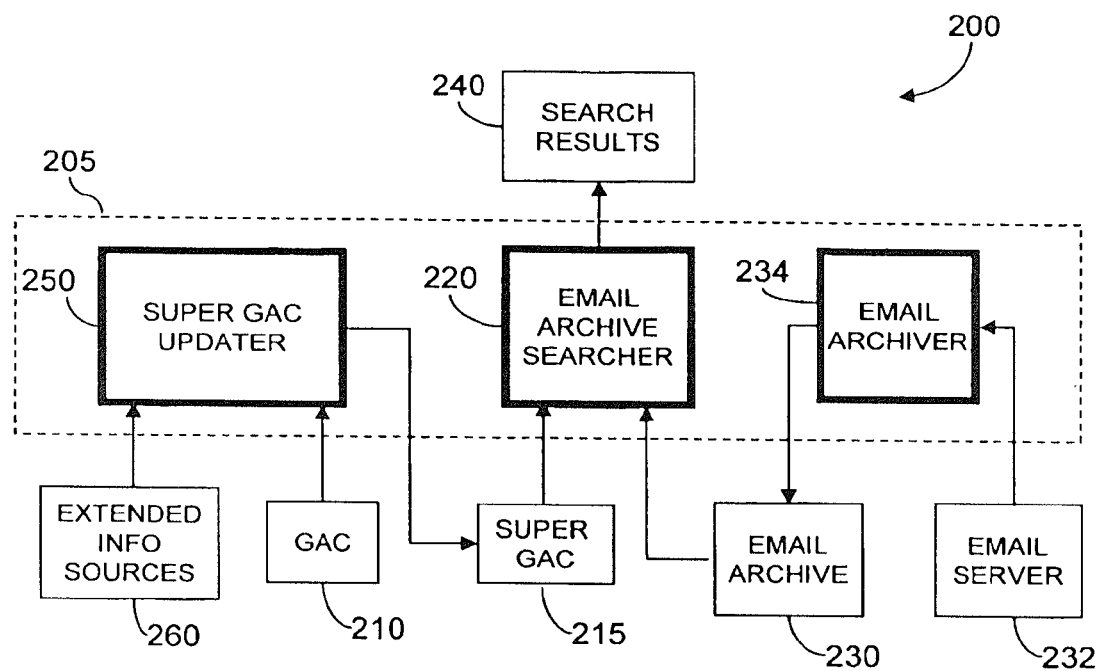
FIG. 2 is a block diagram showing a system on which an email archive searcher and a super global address catalog (GAC) is implemented in accordance with one embodiment of the invention.

FIG. 2 illustrates a block diagram of a system 200 in accordance with one embodiment of the invention that employs to a super GAC 215 that can be used by a message management system 205 to search an email archive 230. This is one example of a system that can use a super GAC, but embodiments of the invention relating to a super GAC are not limited to this or any other particular system implementation.

The message management system 205 comprises an email archiver 234 that retrieves incoming and outgoing emails from email server 232 of an email system and archives the email messages in an email archive 230 using any archiving method. For example, the email archive 230 may contain stored messages in a plurality of folders with different retention periods, where the retention period is the length of time from initial storage before emails in that folder are deleted. The email archive 230 may have associated metadata which may facilitate searching of the archive. One example of metadata associated with an email archive is a full-text index, containing an index of all terms in the messages contained in the email archive.

An email archive searcher 220 executes a search (e.g., in response to a search request from a user) of the email archive 230 for emails received at and/or sent from specified email addresses, and may output search results 240.

System 200 also includes a GAC 210 and can also include extended information sources 260. The GAC 210 can take any form, as the invention is not limited to use with systems having GACs of any particular configuration. The GAC 210 may be created and maintained by an email application program (not shown). For example, the GAC may contain a list of messaging identities in an organization, where each messaging identity entry may have an associated display name, email addresses, domain account names, messaging identity attributes, and/or other information. The messaging identity entries in the GAC 210 may relate to people, distribution lists, aliases, or any other identities, as the invention is not limited in this respect.

In some embodiments, the super GAC 215 can be populated with information from extended information sources other than a single GAC 210. As an example, there may be repositories (e.g., databases) of information in an organization such as human resource records, payroll, etc., and in one embodiment, information from these sources can be added to the super GAC 215, as discussed below. In the illustrative implementation of FIG. 2 an updater 250 is provided to update the super GAC 215 with information from external sources, but the super GAC 215 may be populated in any way, as the invention is not limited in this respect. In one embodiment, the current email archive 230 can also be used as an extended information source to extract information which can be used to populate the super GAC 215. In another embodiment, information from two or more GACs from different systems can be used to populate a single super GAC 215. This can be advantageous when an organization is using multiple different email systems maintaining separate GACs. In such cases, it may be desirable to create a single super GAC containing the information from the separate GACs, thereby consolidating information for messaging identities in the organization.

It should be understood that the examples provided above concerning the way in which the super GAC 215 can be populated with information from sources other than from the GAC 210 are merely illustrative, and that the embodiments directed to the use of a super GAC is not limited to one populated in the ways described above.

The super GAC updater 250 may process information from the GAC 210, and optionally also one or more extended information sources 260, to create and/or update the super GAC 215. In one embodiment, the super GAC 215 may contain a list of messaging identities in the organization, including identities that may differ from those in the GAC 210. For example, the super GAC 215 may include current messaging identity entries contained in the GAC 210, messaging identity entries that were deleted from the GAC 210 (e.g., as a result of people departing the organization), and/or messaging identity entries whose associated data (e.g., display names, email addresses, and/or other information) has been modified in the GAC 210 (e.g., due to name changes, organization restructuring, or any other reason).

In instances when information is deleted from or modified in the GAC 210, the super GAC 210 may include the prior information and time bound information describing an effective temporal period for which the information is accurate. This is advantageous when responding to queries, since information may be associated with a particular identity only during a certain time period. For example, an email address may be associated with a particular messaging identity during a certain time period, and beyond that period, that email address could be associated with another messaging identity.

In one embodiment, where information in the super GAC 215 is time bounded, time information can be provided in numerous ways, and the invention is not limited to any particular way of providing time information. For example, time information can manually be entered into the super GAC 215. In other embodiments, time information may be determined using one or more extended information sources 260, or any other suitable approach. Furthermore, any given method of providing time information may be used on its own, or may used in combination with one or more other methods for providing time information.

The super GAC 215 may also include additional information further restricting the association of email addresses with people in the organization. In one embodiment, such additional information may include begin and/or end times, or any other information. As previously noted, as used herein, the term time refers to any temporal indicator of any granularity (e.g., year, month, day, hour, minute, etc.).

Begin and end times for an email address of a person may specify a time period during which the email address was associated with the person. For example, an end time associated with an email address for a person may be desirable when the person departs the organization and their email address is reused by another person.

Numerous implementation are possible with regards to begin times and end times in the super GAC 215, as the embodiments that employ this feature are not limited to any particular implementation. In one embodiment, each messaging identity entry in the super GAC 215 may have a global begin and end time applying to all email addresses associated with the identity, and/or each email address belonging to the identity may possess individual begin and end times. Individual begin and end times for each email address may be useful when a person has not departed the organization, but one or more of their former email addresses may no longer be associated with the person. In contrast, global begin and times may be useful when a person has departed the organization, and therefore all of their former email addresses are no longer associated with the person.

In one embodiment, the email archive searcher 220 may use information in the super GAC 215 to resolve a messaging identity into associated email addresses, and utilize the associated email addresses to search the email archive 230 for emails that have been sent or received by the messaging identity. The email archive searcher 220 may output the results of the email archive search as search results 240.

Figure 3:
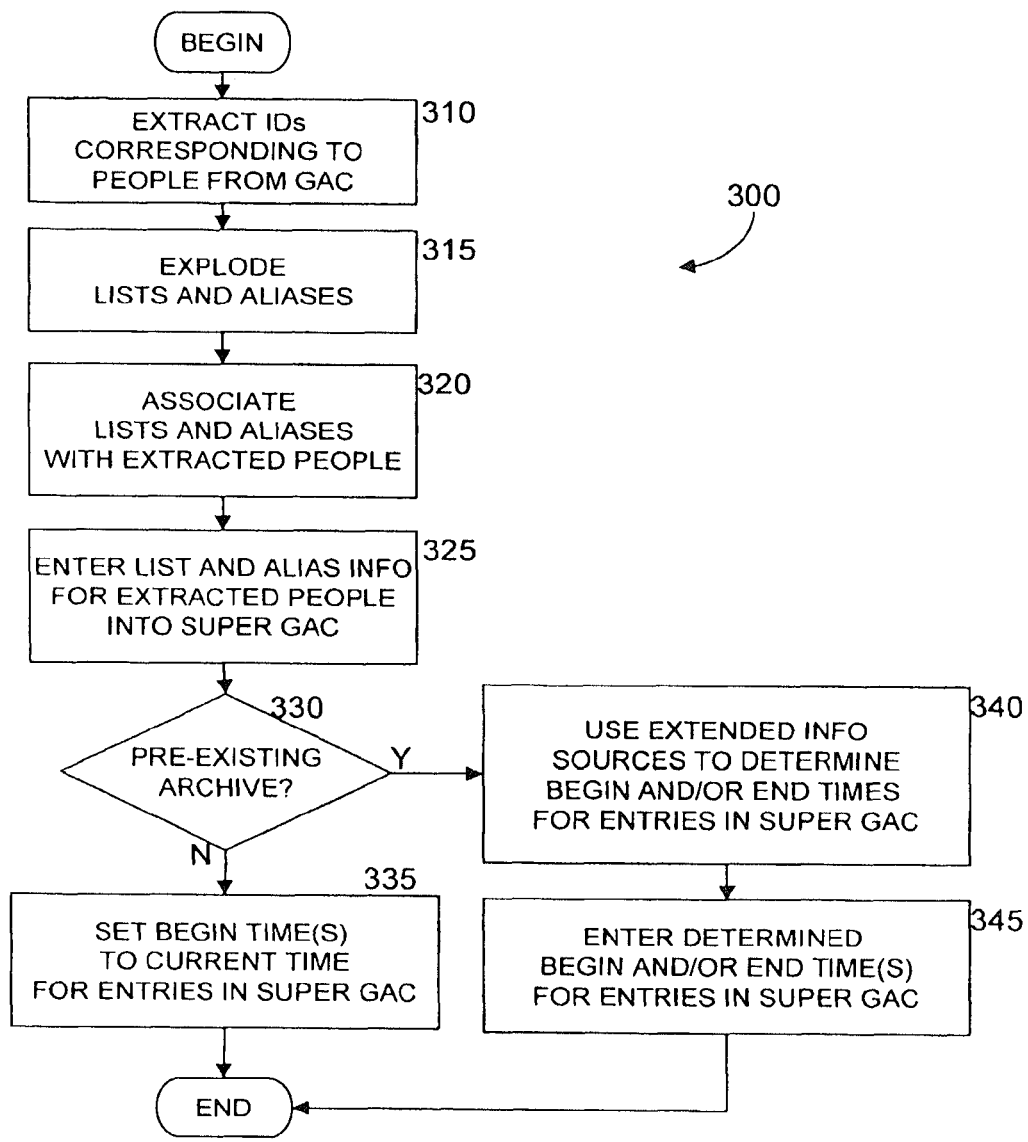
FIG. 3 is a flowchart showing a process for performing an initial build of a super GAC in accordance with one embodiment of the invention.

FIG. 3 is a flowchart illustrating one embodiment of a super GAC initial build process 300, which may be performed by the super GAC updater 250, or by any other component(s), as the invention is not limited in this respect. FIG. 3 shows merely one example, as a super GAC initial build can be performed in other ways. Acts performed in process 300 may be automated, manual or combinations thereof.

Process 300 begins in act 310 where messaging identities in the GAC 210 corresponding to people are extracted and stored in the super GAC 215. In act 315, the messaging identities in the GAC 210 corresponding to non-people (e.g., distribution lists and aliases) are exploded so as to determine the email addresses included in them. In act 320, the distribution lists and aliases are associated with the extracted people (determined in act 310) based on the email addresses determined in act 315. In act 325, a record of the distribution lists and aliases associated with each person is entered into the appropriate people entries in the super GAC 215. In this way, people entries extracted from the GAC 210 have corresponding super GAC 215 entries, and each of these people entries in the super GAC 215 may have an associated display name, email addresses, aliases, distribution lists to which the person belongs, and other information.

In act 330, a determination is made as to whether an email archive has been in existence prior to the initial super GAC build process 300. For example, an email archive 230 that has been in use for months or years may qualify as a preexisting archive system, and in such cases numerous changes may have been performed on the entries in the GAC 210 prior to the execution of process 300. In such instances, the email archive 230 may contain emails associated with deleted and/ or modified email addresses, and information correlating these email addresses to appropriate people in the organization may not be contained in the current GAC 210.

When the email archive system is not a preexisting system, process 300 proceeds to act 335, where begin times for each of the entries in the super GAC 215 may be set to the current time. As previously mentioned, a begin time may be assigned to the association of an email address with a messaging identity, and therefore, email addresses associated with messaging identities in the super GAC 215 may have corresponding begin times for each email address.

In contrast, when it is determined (in act 330) that the email archive system is a pre-existing system, process 300 proceeds to determine begin and/or end times for entries in the super GAC 215. This can be done in any of numerous ways, as the invention is not limited in this respect. In the embodiment shown in FIG. 3, the process proceeds to act 340, where extended information sources 260 are consulted to determine begin and/or end times for entries in the super GAC 215. For example, a human resource database and/or payroll data sources may be used to determine begin times for identity entries in the super GAC 215, based on start and termination times for employees. For example, the extended information sources 260 may contain times indicating when a person joined or left the organization, information relating to times of name changes, or other relevant information about people in the organization. In one embodiment, the current email archive 230 may optionally be used as an extended information source 260, so as to assist in determining begin and end times. For example, the current email archive can be searched to extract email messages sent or received by a given person associated with a given email address and display name. Upon extraction of the email messages, the time of the oldest email message can be used as the begin time for the association of the email address with the given person. Furthermore, when it has been determined that the person is no longer part of the organization (e.g., using human resource and/or payroll data sources), the time of the most recent email associated with the person can be used as the end time.

In act 345, begin times are recorded in the super GAC 215. Also, when it is determined (e.g., from the extended information sources 260) that a person is no longer part of the organization as of a past time, the end time for that person may be entered into the super GAC 215.

Process 300 results in the initial build of a super GAC 215 which may contain a list of entries for messaging identities in the organization, where each entry may include an associated display name, email addresses, aliases, distribution lists, domain account names, messaging identity attributes, begin and end times, termination indicators, and any other information associated with each person, as the invention is not limited in this respect.

It should also be appreciated that the use of supplemental databases is one example of extended information sources that may be used to construct the super GAC 215. The invention in not limited to the use of any particular databases as extended information sources, nor to the use of any extended information sources at all, as some embodiments do not employ extended information sources in building the super GAC.

In another embodiment, multiple GACs 210 may be used to build the super GAC 215 in process 300, resulting in a merge of the multiple GACs 210 into a super GAC 215 that can be used to manage multiple different email systems. Such a procedure may be desirable when an organization is using multiple different email systems maintaining separate GACs. In such a case, it is desirable to create a super GAC 215 containing the information from the separate GACs, thereby consolidating information for messaging identities in the organization. In one embodiment, GACs from email systems of different vendors may be combined using process 300 to create a super GAC 215 that contains information from the GACs of the different email systems.

Once a super GAC 215 has been initially built, the super GAC 215 may be updated to reflect, in any suitable manner, changes in the GAC 210 that have occurred after the initial build of the super GAC 215. In one embodiment, an administrator may chose a super GAC 215 update time interval which determines how often the super GAC 215 is automatically updated. For example, the super GAC 215 update process may be performed at regular intervals (e.g., daily, weekly, monthly, etc.). The super GAC 215 update process can be initiated automatically and/or manually. For example, the super GAC 215 update process may be initiated at any time at the request of the administrator. The super GAC 215 update process may be performed by a super GAC updater 250, or by any other component, as the invention is not limited to any particular implementation.

In accordance with one embodiment, a super GAC 215 may be updated to store historical data associated with modifications in a GAC 210.

Figure 4:
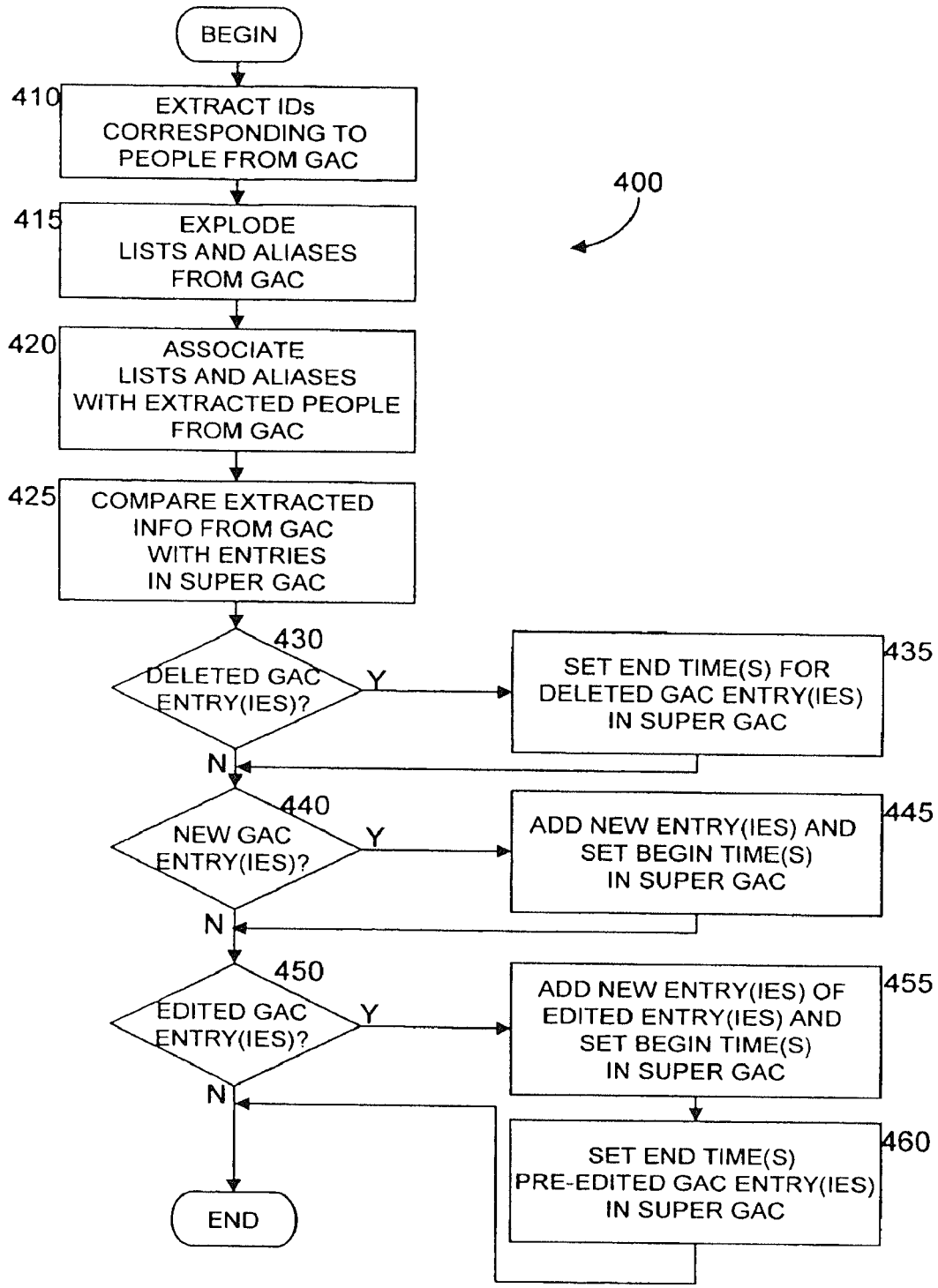
FIG. 4 is a flowchart showing a process for updating a super GAC in accordance with one embodiment of the invention.

FIG. 4 illustrates a flow chart for a super GAC 215 update process 400 for updating the entries in a super GAC 215 based on current entries in the GAC 210. Process 400 may be performed by the super GAC updater 250 in system 200, or by any other component, or combination of components, as the invention is not limited in this respect. Process 400 is just one example of a super GAC 215 update process, which can be performed in other ways.

In act 410, messaging identity entries in the GAC 210 corresponding to people are extracted. In act 415, the messaging identity entries in the GAC 210 corresponding to distribution lists and aliases are exploded so as to reveal associated email addresses. In act 420, the distribution lists and aliases present in the GAC 210 are associated with the extracted people determined in act 410, based on the email addresses associated with the distribution lists and alias (determined in act 415).

In act 425, the extracted information determined in acts 410, 415 and 420 is compared with entries present in the current super GAC 215. In particular, the comparison may include a determination of whether information in the GAC 210 has been deleted, added, and/or edited, as compared to information contained in the current super GAC 215.

In act 430, a determination is made as to whether any entries have been deleted from the GAC 210 based on a comparison with the current super GAC 215. When it is determined that GAC entries have been deleted, process 400 proceeds to act 435, where end times of the one or more deleted entries are entered in the super GAC 215. These end times denote times beyond which email addresses associated with a person may no longer be associated with that person. The end time for an email address associated with a given person may be determined in any suitable way, as the invention is not limited in this respect. In one embodiment, the end time of an email address associated with a given person may be determined by searching the email archive 230 for the most recent email, associated with the display name of the given person, that was received at and/or sent from the associated email address. Upon determining the most recent email, the end time may be set to the send or receive time of the most recent email. Furthermore, when it is determined that only one of several individual email addresses associated with a person has been deleted, an end time may be updated for that email address only, as the others remain valid.

When it is determined that there are no deleted GAC 210 entries (in act 430) or when act 435 is completed, process 400 proceeds to act 440, where it is determined whether new entries have been added to the GAC 210 as compared with entries present in the super GAC 215.

When it is determined that new entries have been added to the GAC 210, process 400 proceeds to act 445, where the new entries added to the GAC 210 are entered in the super GAC 215, and the begin times for the new entries may be set to an appropriate time. In one embodiment, the begin times may be set to the current time. In another embodiment, when begin time information is present in extended information sources 260, this information may be used to determine the begin times for the new entries that were added to the GAC 210.

When it is determined that no new entries have been added to the GAC 210 or act 445 is completed, process 400 proceeds to act 450, where it is determined whether there are any edited GAC entries in the GAC 210.

When it is determined that there are one or more edited entries in the GAC 210, process 400 proceeds to act 455, where new entries may be added the super GAC 215 corresponding to edited entries in the GAC 210, and associated begin times for the new edited entries may be set in the super GAC 215. In one embodiment, entries in the super GAC 215 corresponding to the edited GAC entries may have their associated end times set to a time determined from the extended information sources 260, but the invention is not limited to use with extended information sources 260. For example, the begin time for an email address associated with a given person may be determined by searching the email archive 230 for the most recent emails associated with the display name of the given person that were received at or sent from the associated email address.

Process 400 then proceeds to act 460, where the entries in the super GAC 215 corresponding to the pre-edited GAC entries may have their associated end times set to a time determined in any suitable manner. In one embodiment, entries in the super GAC 215 corresponding to the pre-edited GAC entries may have their associated end times set to a time determined from the extended information sources 260, but the invention is not limited to use with extended information sources 260. For example, the end time for an associated email address associated with a given person may be determined by searching the email archive 230 for the most recent emails associated with the display name of the given person that were received at or sent from the associated email address. Using such a technique, all edits to the GAC 210 may be recorded and historical information may be retained in the super GAC 215.

When it is determined in act 450 that there are no edited GAC entries or act 460 is completed, process 400 terminates.

It should be appreciated that in the updating process 400 described above, an end time is only specified for information that may no longer be valid, and any information without a corresponding end time may be considered to still be valid.

Actions which may lead to deletion, addition, and/or editing of GAC 210 entries are numerous, and the embodiments of the invention described herein are not limited in this respect. For example, a person's entire entry may be deleted from a GAC 210 upon departing an organization. Also, a domain may be removed from an organization, and as a result, entries for people with domain account names associated with that domain may be removed from the GAC 210. In addition, transferring a person from one division to another may result in information in the GAC 210 associated with that person being modified. For example, an email address, domain account name, and/or other messaging identity attributes (e.g., organization name, office building, department) may be modified due to a division transfer.

In another embodiment, multiple GACs 210 may be used to update the super GAC 215 in process 400. The multiple GACs may include GACs from email systems from different vendors.

In accordance with one embodiment, the super GAC 215 may be utilized to facilitate the search of the email archive 230 for emails satisfying a search query (e.g., to find email messages corresponding to specific people in the organization).

Figure 5:
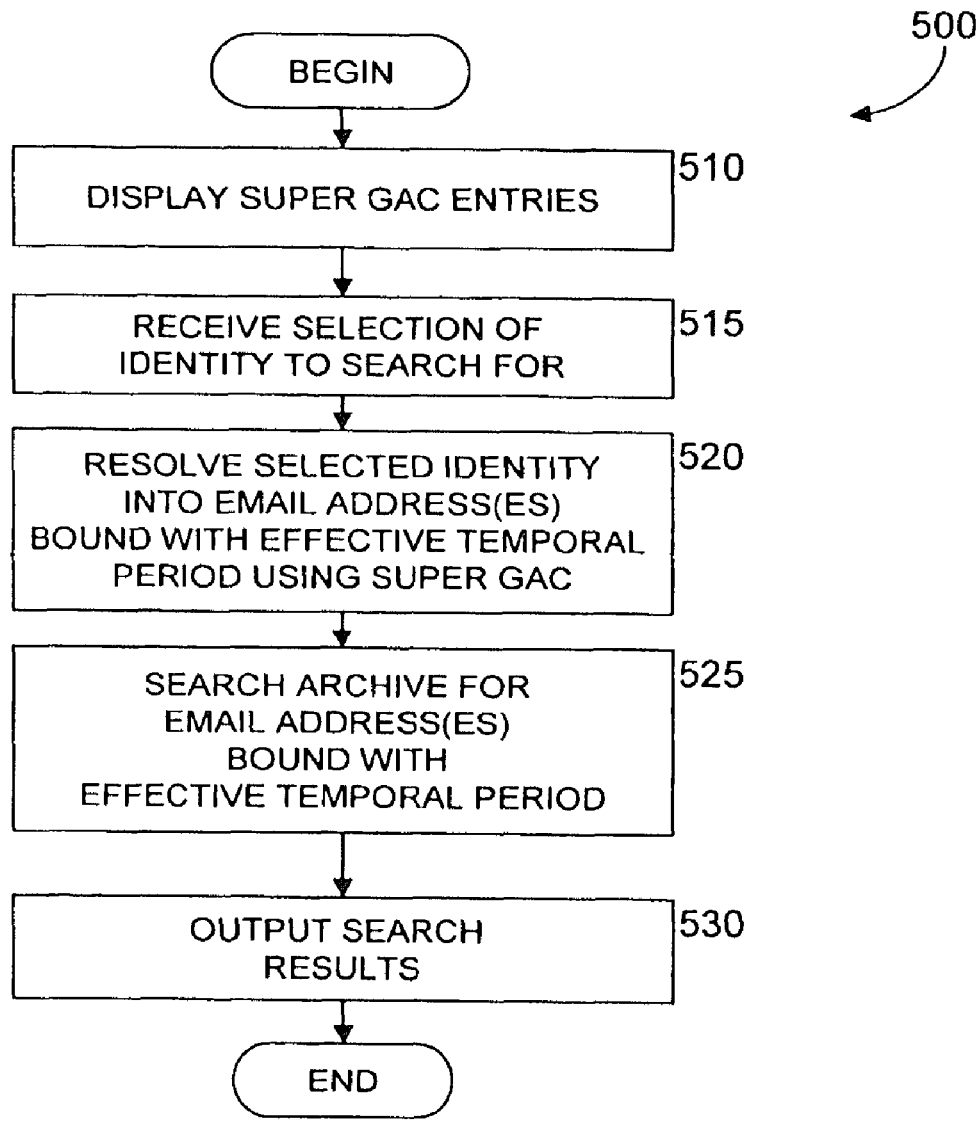
FIG. 5 is a flowchart showing a process for performing an email archive search query process in accordance with one embodiment of the invention.

FIG. 5 illustrates a flow chart for a process 500 for performing an email archive search query. Process 500 may be executed in its entirety or in part by the email archive searcher 220, and/or by any other component, as the invention is not limited in this respect.

In act 510, information in the super GAC 215 may be displayed, and as a result, a user may select one or more pieces of information for which they would like to search in the email archive 230. The displayed information can take any form, as the invention is not limited in this respect. For example, the displayed information may be the messaging identities contained in the super GAC 215. Alternatively, a user may search the super GAC 215 for a specific display name, email address, domain account name, other messaging identity attributes, or any other attribute, and select which messaging identities' emails they would like to retrieve from the email archive 230.

In act 515, process 500 receives a selection of the messaging identities whose associated email messages should be searched for in the email archive 230. In act 520, the process 500 proceeds to resolve the selected messaging identities based on information contained in the super GAC 215. Associated email addresses for the selected messaging identities may be bound with begin times, end times, and/or any other information which may specify the association of an email address with a messaging identity for a specific temporal interval. For example, the above-mentioned user John Smith may have had an associated email address "JSmith@Company.com" for a first temporal period, but that same email address may be associated with the above-mentioned user Jane Smith for a second temporal period, where the first and the second temporal periods do not overlap. For that example, a query for emails associated with Jane Smith will return emails associated with the "JSmith@Company.com" email address sent and/or received during the second temporal period, and a query for emails associated with John Smith will return emails associated with the "JSmith@Company.com" email address sent and/or received during the first temporal period.

Upon resolution of the selected messaging identities into associated email addresses, in act 525, the email archive 230 is searched for email messages received at or sent from the associated email addresses, restricted by the begin and end times associated with the email addresses, where appropriate. Upon determination of which emails in the email archive 230 have been received at or sent from the associated email addresses for the selected identities (between corresponding begin and end times), process 500 proceeds to act 530 wherein the email archive search results are outputted. For example, the search results may be presented to a user, showing the email message title, sent address, received address, time, size, and any other information as the invention is not limited in this respect. Furthermore, upon selection of one or more of the search results, the associated complete email message may be presented.

As mentioned above, in accordance with another embodiment, a super GAC 215 (or a GAC 210) may be searched based on search criteria other than messaging identity display names.

Figure 6:
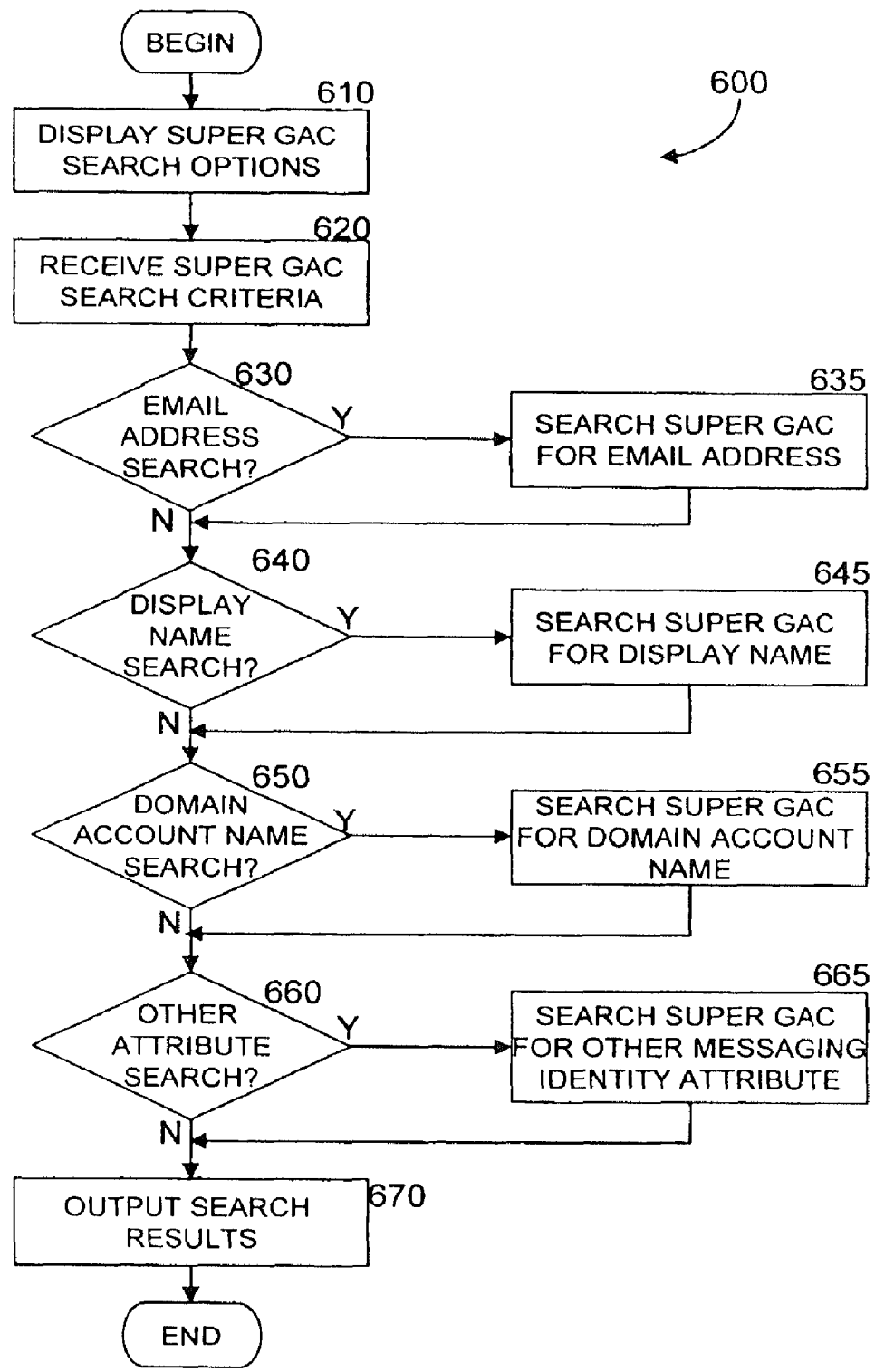
FIG. 6 is a flowchart showing a process for performing a GAC search query process in accordance with one embodiment of the invention.

FIG. 6 illustrates a flowchart of a process 600 for searching a super GAC 210 based on search criteria, so as to select one or more messaging identities corresponding to the search criteria. The process 600 does not search the email archive 230, but rather searches the super GAC 215 so as to present one or more messaging identities that satisfy search criteria (e.g., provided by a user). In another embodiment, process 600 can be combined with a process such as illustrated in FIG. 5 to return emails from the email archive 230.

In act 610, process 600 may display search options, allowing a user to select whether they would like to search the super GAC 215 for messaging identities based on email address information, display name information, domain account name information, other messaging identity attribute information, and/or any other information contained in the super GAC 215.

In act 620, process 600 receives the search information provided by in response to act 610 and proceeds to perform a search of the super GAC 215 based on the provided search criteria.

In act 630, it is determined whether the search of the super GAC 215 should be conducted based on email address information. When a user has selected the email address search option, and provided suitable email addresses for which to search, process 600 proceeds to act 635 where the super GAC 215 is searched for email addresses that correspond to those provided by the user. Search results may be presented immediately and/or recorded for subsequent presentation.

Process 600 proceeds to act 640 after completing act 635, or after it is determined that an email address search was not selected (act 630). In act 640, a determination is made as to whether a display name search was selected by the user, and if so, process 600 proceeds to act 645 where the super GAC 215 is searched for messaging identities corresponding to the selected display names. Search results may be presented immediately and/or recorded for subsequent presentation.

Upon completion of act 645, or after it is determined (in act 640) that a display name search was not selected, process 600 proceeds to act 650, where it is determined whether a domain account name search was selected. When a domain account name search was selected, process 600 proceeds to act 655, where the super GAC 215 is searched for messaging identities possessing one or more domain account names selected by the user. Search results may be presented immediately and/or recorded for subsequent presentation.

Upon completion of act 655, or after it is determined (in act 650) that a domain account name search was not selected, the process 600 proceeds to act 660, where it is determined whether a specific messaging identity attribute search was selected. When a messaging identity attribute search was selected, process 600 proceeds to act 655, where the super GAC 215 is searched for messaging identities possessing a messaging identity attribute specified by the user in the search criteria. Search results may be presented immediately and/or recorded for subsequent presentation.

Upon completion of act 655, or after determining in act 660 that a domain account name search was not selected, process 600 proceeds to act 670, where the search results of the super GAC are presented.

In one embodiment, the output of the super GAC search results may comprise a list of one or more messaging identities that satisfy the search criteria. One or more messaging identities may then be selected (e.g., by a user) and the selected identities may be used in conjunction with any other processes which use one or more selected messaging identities in the super GAC 215. For example, process 600 may be used so as to display super GAC identities in act 510 of process 500.

As should be appreciated from the foregoing, there are numerous aspects of the present invention described herein that can be used independently of one another, including the aspects that relate to building and updating a distinct global messaging identities catalog different from a GAC, preserving information that has been deleted or edited in the GAC, binding the validity of an email address for a particular user with an effective temporal interval, searching an email archive for emails associated with email addresses bound by an effective temporal interval, enabling a user to search a GAC based on a specified display name, email address, domain account name, other messaging identity attributes, and/or based on any other attribute.

It should also be appreciated that a processor programmed to perform a given act may also perform other acts in addition to the given act. For example, a processor programmed to perform a given act (e.g., creating a super GAC) may also run an email system and/or an extension system for the email system.

However, it should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. A method for use in a computer system comprising an email system that generates and receives email messages, the email system managing a first plurality of email messages comprising at least some of the email messages generated and received by the email system, the computer system further comprising an extension system that interfaces with the email system and manages a second plurality of email messages comprising at least some of the email messages generated and received by the email system, the method comprising:
    (A) creating, by the computer system, an extender catalog that comprises a list of messaging identities and provides an index into the second plurality of email messages by providing an association between the extender catalog messaging identities and information that can be used to determine which of the second plurality of email messages belong to which extender catalog messaging identities, wherein the extender catalog comprises at least some information that is different than the information in a global address catalog (GAC) provided by the e-mail system, wherein the GAC comprises a list of messaging identities for an organization serviced by the email system and provides an index into the first plurality of email messages by providing an association between the GAC messaging identities and information that can be used to determine which of the first plurality of email messages belong to which GAC messaging identities.

2. The method of claim 1, wherein at least one of the email messages generated or received by the email system is included in only one of the first plurality of email messages and the second plurality of email messages.

3. The method of claim 1, wherein the act (A) comprises an act of creating the extender catalog to include at least some information that is not included in the GAC.

4. The method of claim 1, wherein the act (A) comprises an act of creating the extender catalog at least partially using the information from the GAC.

5. The method of claim 1, wherein the act (A) comprises an act of creating the extender catalog at least partially using the information from at least one source other than the GAC.

6. The method of claim 1, wherein the extender catalog provides an interface to enable a user to search the second plurality of email messages.

7. The method of claim 1, wherein the at least some information that is different than the information in the GAC comprises temporal information.

8. The method of claim 7, wherein the temporal information comprises a temporal period for which an email address is associated with a messaging entity.

9. At least one non-transitory computer readable medium encoded with a plurality of instructions that, when executed, perform a method for use in a computer system comprising an email system that generates and receives email messages, the email system managing a first plurality of email messages comprising at least some of the email messages generated and received by the email system, the computer system further comprising an extension system that interfaces with the email system and manages a second plurality of email messages comprising at least some of the email messages generated and received by the email system, the method comprising:
    (A) creating an extender catalog that comprises a list of messaging identities and provides an index into the second plurality of email messages by providing an association between the extender catalog messaging identities and information that can be used to determine which of the second plurality of email messages belong to which extender catalog messaging identities, wherein the extender catalog comprises at least some information that is different than the information in a global address catalog (GAC) provided by the e-mail system, wherein the GAC comprises a list of messaging identities for an organization serviced by the email system and provides an index into the first plurality of email messages by providing an association between the GAC messaging identities and information that can be used to determine which of the first plurality of email messages belong to which GAC messaging identities.

10. The at least one computer readable medium of claim 9, wherein at least one of the email messages generated or received by the email system is included in only one of the first plurality of email messages and the second plurality of email messages.

11. The at least one computer readable medium of claim 9, wherein the act (A) comprises an act of creating the extender catalog to include at least some information that is not included in the GAC.

12. The at least one computer readable medium of claim 9, wherein the act (A) comprises an act of creating the extender catalog at least partially using the information from the GAC.

13. The at least one computer readable medium of claim 9, wherein the act (A) comprises an act of creating the extender catalog at least partially using the information from at least one source other than the GAC.

14. The at least one computer readable medium of claim 9, wherein the extender catalog provides an interface to enable a user to search the second plurality of email messages.

15. The at least one computer readable medium of claim 9, wherein the at least some information that is different than the information in the GAC comprises temporal information.

16. The at least one computer readable medium of claim 9, wherein the temporal information comprises a temporal period for which an email address is associated with a messaging entity.

17. At least one apparatus for use in a computer system comprising an email system that generates and receives email messages, the email system managing a first plurality of email messages comprising at least some of the email messages generated and received by the email system, the computer system further comprising an extension system that interfaces with the email system and manages a second plurality of email messages comprising at least some of the email messages generated and received by the email system, the at least one apparatus comprising:

at least one processor programmed to create an extender catalog that comprises a list of second messaging identities and provides a second index into the second plurality of email messages by providing an association between the second messaging identities and information that can be used to determine which of the second plurality of email messages belong to which second messaging identities, wherein the extender catalog comprises at least some information that is different than the information in a global address catalog (GAC) that comprises a list of messaging identities for an organization serviced by the email system and provides an index into the first plurality of email messages by providing an association between the GAC messaging identities and information that can be used to determine which of the first plurality of email messages belong to which GAC messaging identities.

18. The at least one apparatus of claim 17, wherein the at least one processor is programmed to create the extender catalog at least partially using the information from the GAC.

19. The at least one apparatus of claim 17, wherein the at least some information that is different than the information in the GAC comprises temporal information.

20. The at least one apparatus of claim 17, wherein the temporal information comprises a temporal period for which an email address is associated with a messaging entity.

* * * * *